(12) United States Patent
Tang et al.

(10) Patent No.: US 12,079,020 B2
(45) Date of Patent: Sep. 3, 2024

(54) CONSTANT CURRENT SOURCE CALIBRATION CIRCUIT, CONSTANT CURRENT SOURCE DRIVE CIRCUIT, DRIVE CHIP, AND ELECTRONIC DEVICE

(71) Applicant: CHENGDU LIPPXIN MICROELECTRONICS CO., LTD, Sichuan (CN)

(72) Inventors: Yongsheng Tang, Sichuan (CN); Li Huang, Sichuan (CN); Shixiong Lu, Sichuan (CN)

(73) Assignee: CHENGDU LIPPXIN MICROELECTRONIC CO., LTD., Chengdu (CN)

( * ) Notice: Subject to any disclaimer, the term of this patent is extended or adjusted under 35 U.S.C. 154(b) by 0 days.

(21) Appl. No.: 18/092,740

(22) Filed: Jan. 3, 2023

(65) Prior Publication Data

US 2023/0236616 A1  Jul. 27, 2023

(30) Foreign Application Priority Data

Jan. 27, 2022  (CN) .......................... 202210102906.9

(51) Int. Cl.
  *G05F 3/26* (2006.01)
  *G05F 1/59* (2006.01)

(52) U.S. Cl.
  CPC ................ *G05F 1/59* (2013.01); *G05F 3/262* (2013.01)

(58) Field of Classification Search
  None
  See application file for complete search history.

(56) References Cited

U.S. PATENT DOCUMENTS

| | | | | |
|---|---|---|---|---|
| 4,647,907 A | * | 3/1987 | Storey | H03M 1/1047 341/118 |
| 6,462,527 B1 | * | 10/2002 | Maneatis | H03L 7/18 323/315 |
| 7,733,119 B1 | * | 6/2010 | Kamath | F17C 13/002 326/30 |
| 8,509,008 B2 | * | 8/2013 | Lee | G11C 5/147 365/189.09 |
| 8,941,522 B2 | * | 1/2015 | Medina Sanchez-Castro | H03M 1/785 341/144 |
| 9,887,702 B1 | * | 2/2018 | Miglani | H03M 3/424 |
| 10,042,380 B1 | * | 8/2018 | Hung | G05F 5/00 |
| 10,574,141 B2 | * | 2/2020 | Chang | H02M 3/156 |
| 2008/0246712 A1 | * | 10/2008 | Cavallini | G09G 3/3685 345/89 |

* cited by examiner

*Primary Examiner* — Thomas J. Hiltunen
(74) *Attorney, Agent, or Firm* — Lei Fang, Esq.; Smith Tempel Blaha LLC

(57) ABSTRACT

The present disclosure relates to a constant current source calibration circuit, a constant current source drive circuit, a drive chip, and an electronic device. The current calibration circuit includes a resistor and a calibration circuit connected to the resistor for adjusting a voltage drop across two ends of the resistor; and a selector or a switch connected to the two ends of the resistor, and configured to select one end of the resistor to be connected to a constant current source output channel and the corresponding other end to be supplied with a first bias voltage VD. Since the first bias voltage VD is a fixed constant, the voltage drop across the two ends of the resistor is adjusted.

14 Claims, 10 Drawing Sheets

CONSTANT CURRENT SOURCE CALIBRATION CIRCUIT, CONSTANT CURRENT SOURCE DRIVE CIRCUIT, DRIVE CHIP, AND ELECTRONIC DEVICE

CROSS-REFERENCE TO RELATED APPLICATIONS

The present disclosure claims the priority to the Chinese Patent Application No. 2022101029069, entitled "Constant Current Source Calibration Circuit, Constant Current Source Drive circuit, Drive chip, and Electronic Device", and filed with the China Patent Office on Jan. 27, 2022, the entire contents of which are incorporated herein by reference.

TECHNICAL FIELD

The present disclosure relates to the technical field of integrated circuits, and in particular to a constant current source calibration circuit, a constant current source drive circuit, a drive chip, and an electronic device.

BACKGROUND ART

The constant current source circuit is mainly composed of an input stage and an output stage, wherein the input stage provides a reference current, and the output stage outputs the required constant current. The constant current source circuit is to be able to provide a stable current to ensure the stable operation basis for other circuits. That is, the constant current source circuit is required to output a constant current, so the device used as the output stage should have a volt-ampere characteristic with a saturated output current. This can be achieved with a BJT (Bipolar Junction Transistor) or MOSFET (Metal-Oxide-Semiconductor Field-Effect Transistor, MOS for short) operating in an output current saturation state.

Reference is made to FIG. 1 which is a commonly-used constant current source drive generating circuit, wherein R_EXT is an external resistor of the chip, and if the gains of all amplifiers in the figure are assumed to be infinite, the generation principle of the constant current source is as follows.

The required reference potential VREF1 is generated from the Bandgap (Bandgap voltage reference); the source potential of the NMOS tube NM0 is clamped to VREF1 by the amplifier AMP1, so the magnitude of source-drain current flowing through the PMOS tube PM0 is: I0=VREF1/R_EXT; PMOS tubes PM1 and PM0 constitute a current mirror, wherein if the current ratio of the current mirror, that is, the ratio of the source-drain current of the PMOS tube PM1 to the source-drain current of the PM0 is assumed to be K, the magnitude of source-drain current of the PMOS tube PM1 is I1=K*VREF1/R_EXT; when the constant current source channel is turned on, the amplifiers AMP3 and AMP_C clamp the drain potentials of the NMOS tubes NM1 and NM_C0 to VREF2 respectively, and the potentials of all terminals of the NMOS tube NM_C0 of the constant current source output channel are the same as the potentials of all terminals of the NMOS tube NM1. The output current magnitude of the channel is the ratio mirror of the source-drain current magnitude of the NM1, wherein if the mirror ratio is assumed to be J, the output constant current magnitude (absolute value) of the constant current source channel at this time is IOUT=J*K*VREF/R_EXT (here, *represents multiplication, and/represents division). In a general constant current source drive chip, J*K is a fixed value, so the magnitude of the output constant current of the constant current source channel is adjusted by adjusting the magnitude of the resistance of the external resistor R_EXT.

The defect of the prior art is that because the output current is determined by the current mirror formed by NM1 and NM_C0, and is limited by the influence of factors such as process deviation, there is a problem of poor current consistency among the individual channels.

SUMMARY

The purpose of the present disclosure is to overcome the deficiencies of the prior art and provide a constant current source calibration circuit, a constant current source drive circuit, a drive chip, and an electronic device, which are mainly used to solve the problem of poor current consistency existed among individual channels.

Based on the analysis, it can be found that the factors affecting the current consistency among N+1 channels include that: different drain voltages of MOS tubes among different channels caused by the input offset voltage of the operational amplifier; and the threshold voltage deviation caused by the parameter mismatch of the MOS tube device itself. The purpose of the present disclosure is achieved by calibrating the drain voltages of MOS tubes among channels.

A first aspect of the present disclosure provides a constant current source calibration circuit, which comprises:
a resistor;
a calibration circuit, connected to the resistor and configured for adjusting a voltage drop across two ends of the resistor; and
a selector or a switch connected to the two ends of the resistor, and configured to select one end of the resistor to be connected to a constant current source output channel, and the corresponding other end to be supplied with a first bias voltage VD.

Referring to what is shown in FIG. 1, the first bias voltage VD in the present disclosure is the drain voltage of NM1 in the bias generating circuit, and theoretically VREF2=VD. To keep the precision of the output channels consistent, the drain voltage of NM_C0 in the output channels is required to be equal to the first bias voltage VD. Due to the input offset voltage of the operational amplifier AMP_C, the drain voltage of the NM_C0 is caused to be not equal to the first bias voltage VD, and because the parameters or manufacturing processes of the NM_C0 and the NM1 are different, their output currents are different even if the voltages of the two are equal. The NM_C0 and NM1 are determined by the device itself, so the current cannot be adjusted, and the output current of each channel can only be adjusted by adjusting the drain voltage of the NM_C0. The voltage applied to the drain of the NM_C0 is the third bias voltage VDO, referring to what is shown in FIG. 1, the non-inverting input terminal of the operational amplifier AMP_C is input with the first bias voltage VD, the inverting input terminal (of AMP_C) and the drain of the NM_C0 form a feedback, and the theoretical inverting input terminal voltage is equal to VD. In fact, due to the input offset voltage of AMP_C, the inverting input terminal voltage is caused to be not equal to VD. It is assumed that it is equal to VD, then there is VDO=VD±I*R (here, * represents multiplication), wherein VD is understood as a fixed constant (because this value is invariable, VDO=constant±variable; when the constant is fixed, only the variable needs to be adjusted to get the required VDO, so the VD error does not need to be cared about), I is the current flowing through the resistor, R is the resistance value of the resistor, and the I*R part is the part that is adjusted by the current calibration circuit.

By changing selection of the terminals of the resistor connected to the NM_C0 drain terminal, forward adjustment or reverse adjustment is realized. When the final output current is equal to the standard precision, the adjustment is stopped, and the voltage VDO is the final adjusted voltage, thus realizing the precision adjustment of output current.

Further, the calibration circuit comprises:
a current source;
a bias circuit, connected to the current source and configured for generating a bias current; and
a first calibration circuit and/or a second calibration circuit connected to the bias circuit, wherein the resistor is connected between the first calibration circuit and the second calibration circuit, or in a path of the first calibration circuit or the second calibration circuit,
wherein currents of the first calibration circuit and the second calibration circuit are adjusted synchronously, so that current flowing through the resistor is also synchronously adjusted.

Further, the first calibration circuit comprises M groups of MOS tube assemblies, and each of the groups of MOS tube assemblies and the bias circuit form a first mirror output channel;
the second calibration circuit comprises M groups of MOS tube assemblies, and each of the groups of MOS tube assemblies and the bias circuit form a second mirror output channel; and
the resistor is connected between the M groups of first mirror output channels and the M groups of second mirror output channels, and each of the groups of first mirror output channels and each of the groups of second mirror output channels are both provided with a controlled switch, and magnitude of the current inputted to the resistor is adjusted through switching of the controlled switch.

In this scheme, R is fixed and I is adjusted, so that the current flowing through the resistor R changes, Further, the mirror ratio of the M groups of MOS tube assemblies gradually increases exponentially with an exponent of 2, which is $2^0, 2^1 \ldots 2^{M-2}, 2^{M-1}$ in sequence.

Further, the output currents of both of the M groups of the first mirror output channels and the M groups of the second mirror output channels increase or decrease sequentially in proportion.

In another aspect, the present disclosure also provides another calibration circuit, which includes:
a voltage source; and
a resistance adjusting circuit,
wherein the voltage source, the resistance adjusting circuit, and a resistor form a current channel;
or;
a current source; and
a resistance adjusting circuit, configured to adjust the resistance value of the resistor.
or;
a voltage source; and
a resistance adjusting circuit, wherein the resistance adjusting circuit is a resistor with an adjustable resistance value;
the voltage source, the resistance adjusting circuit, and the resistor form a current channel.

Further, the resistance adjusting circuit includes M groups of calibration resistors connected in series in sequence, and M-way multiplexer (M-way selector), and the M-way multiplexer is used to control the number of calibration resistors connected in the current channel, so as to realize the adjustment of current flowing through the resistor of the constant current source calibration circuit in the first aspect of the present disclosure.

The above-mentioned scheme of the present disclosure is mainly based on the principle of resistance adjustment, and the resistance R itself can be adjusted, or the effective resistance in the current channel can also be adjusted to realize different I*R adjustment principles.

In essence, in order to achieve the purpose of changing the drain voltage of the MOS tube of the output channel, the calibration circuit provided by the present disclosure adjusts the magnitude of current flowing through the resistor to make I*R change, or, the magnitude of the resistance R is adjusted and the current is fixed to make I*R change.

A second aspect of the present disclosure provides a constant current source drive circuit, comprising:
a reference current generating circuit, configured to generate a reference current;
a bias generating circuit, inputted with the reference current, and configured to generate the first bias voltage VD and a second bias voltage VGI required by one or more constant current source output channels; and
the one or more constant current source output channels, connected to the bias generating circuit, and configured for outputting a constant current based on the first bias voltage VD and the second bias voltage VGI,
wherein the current calibration circuit according to the first aspect is further included, wherein the current calibration circuit calibrates the first bias voltage VD, and then obtains a third bias voltage VDO and outputs the third bias voltage to the constant current source output channel.

Further, the constant current source output channel comprises:
a first MOS tube, used as an output switch of the constant current source output channel;
X groups of second MOS tubes, wherein X is an integer greater than or equal to 1, and the second bias voltage VGI is applied to a gate terminal of each second MOS tube;
a first operational amplifier, wherein the first bias voltage VD generated by the bias generating circuit is applied to a non-inverting input terminal thereof, an inverting input terminal thereof is connected to the current calibration circuit, and the current calibration circuit is connected to a drain terminal of the second MOS tube; and
an output terminal of the first operational amplifier is connected to a gate terminal of the first MOS tube, and turn-on and turn-off of the constant current source output channel are controlled by controlling an output of the first operational amplifier.

Further, the constant current source calibration circuit further comprises a current calibration control circuit configured to control the current calibration circuit for calibration, a trimming circuit, a third MOS tube, and a selector,
wherein an output signal of the first operational amplifier is alternatively inputted to a gate terminal of the third MOS tube or the gate terminal of the first MOS tube, through the selector;
the trimming circuit is connected to the reference current generating circuit and is configured to output trimming current to a drain terminal of the third MOS tube, and a source terminal of the third MOS tube is connected to the current calibration circuit;
an input terminal of the current calibration control circuit is connected to the drain terminal of the third MOS tube;
in the output state, the output signal of the first operational amplifier is inputted to the selector, which sends it to the gate terminal of the first MOS tube; and in the calibration state, the output signal of the first operational amplifier is inputted to the selector, which sends it to the gate terminal of the third MOS tube, and the current calibration control circuit controls, based on a drain voltage of the third MOS tube, the current calibration circuit to adjust the current.

Further, the current calibration control circuit includes M+1 groups of control instructions;

one group of instructions is used to control the selector or switch, to select one end of the resistor to be connected to the constant current source output channel; and M groups of instructions are used to control the current adjustment of the current calibration circuit.

Further, when the magnitude of current of the current calibration circuit is adjusted by using the M groups of instructions, the current is gradually adjusted from small to large or from large to small.

Further, the constant current source drive circuit also comprises a current control circuit, wherein the current control circuit comprises X output terminals, and at least one input terminal, wherein the second bias voltage VGI is applied to the input terminal;

when the control signal of a corresponding output terminal is valid, the corresponding output terminal thereof outputs the second bias voltage VGI to a gate terminal of a corresponding second MOS tube, so as to adjust the mirror ratio of the constant current source output channel.

Further, the reference current generating circuit is provided with an external resistor, and the reference current can be adjusted by adjusting the external resistor.

A third aspect of the present disclosure provides a drive chip, which includes the constant current source drive circuit according to the second aspect of the present disclosure.

A fourth aspect of the present disclosure provides an electronic device, which includes the drive chip according to the third aspect of the present disclosure.

The beneficial effects of the present disclosure are as follows: the solution provided by the present disclosure is to adjust the drain voltage of the MOS tube of the output channel based on the required current, and ignore the problems that the input offset voltage of the operational amplifier results in different drain voltages of the MOS tubes among different channels and that the threshold voltage deviation is caused by the parameter mismatch of the MOS tube device itself, thereby outputting a constant and precise current.

DETAILED DESCRIPTION OF EMBODIMENTS

The technical solutions of the present disclosure are further described in detail below with reference to specific embodiments, but the protection scope of the present disclosure is not limited to the following.

Figure 1:
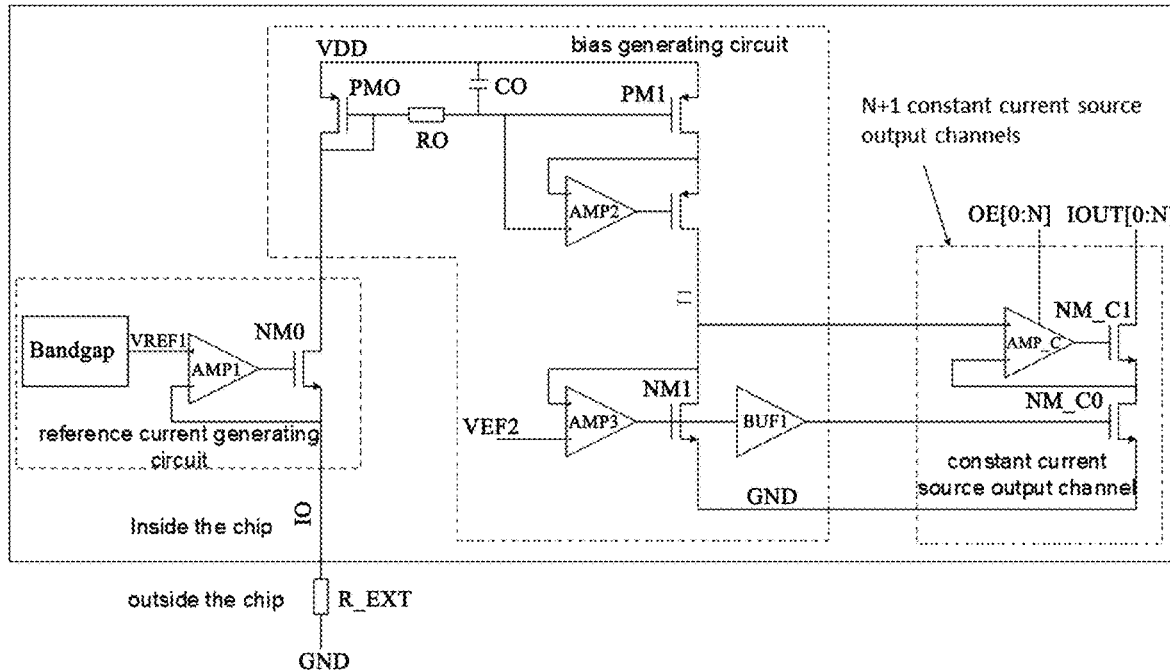
FIG. 1 is a constant current source drive circuit in the prior art.
Figure 2:
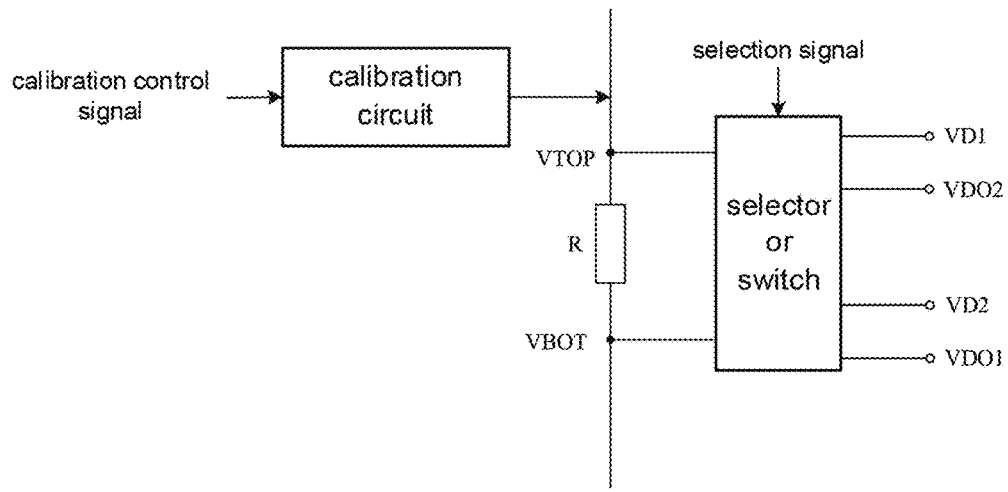
FIG. 2 is a schematic view of a current calibration circuit according to an embodiment of the present disclosure.

Referring to what is shown in FIG. 2, a first aspect of this embodiment provides a constant current source calibration circuit, which includes: a resistor R; a calibration circuit connected to the resistor R for adjusting a voltage drop across two ends of the resistor R; and a selector or a switch connected to the two ends of the resistor R, to select one end of the resistor R to be connected to a constant current source output channel, and the corresponding other end to be supplied/applied with a first bias voltage VD. As shown in FIG. 2, the first end of the resistor R is represented by VTOP, the second end thereof is represented by VBOT, the voltage applied to the constant current source output channel is represented by the third bias voltage VDO, and the selector or switch is connected to VTOP and VBOT, wherein two terminals VD1 and VDO2 come from the VTOP via the selector or switch (1:2Demux), and two terminals VD2 and VDO1 come from the VBOT via the selector or switch (i.e. the VTOP is connected with the input of the selector, and the selector performs selection to make the VTOP applied with the first bias voltage VD or connected to the constant current source output channel), thus forming two input and output combinations (excluding the case where the same terminal is used as both input and output), that is, combination of VD1 and VDO1 and combination of VD2 and VDO2, wherein VDO1 and VDO2 are connected to the constant current source output channel, more specifically to the drain terminal of the MOS tube in the constant current source output channel, VD1 and VD2 are applied with the first bias voltage VD, and the combination of VD1 and VDO1 or combination of VD2 and VDO2 is determined by a selector or switch. Assuming that the current is as indicated by the arrow in FIG. 1, VDO=VD−I*R under the combination of VD1 and VDO1, and VDO=VD+I*R under the combination of VD2 and VDO2. That is to say, the third bias voltage VDO is controlled, through the selector or switch, to increase or decrease. Since VD is fixed, the increased or decreased value is determined by I*R, that is, the value of the current or resistance R is adjusted to realize adjustment of the voltage drop across two ends of the resistor R. As shown in FIG. 2, the calibration control signal and the selection signal in this embodiment are controlled based on the required target current, which will be specially further described later. It is worth noting that VD1, VDO1, VD2, and VDO2 are internal logic terminals, and there are only two leading wires, VD and VDO, in the hardware circuit.

Figure 3:
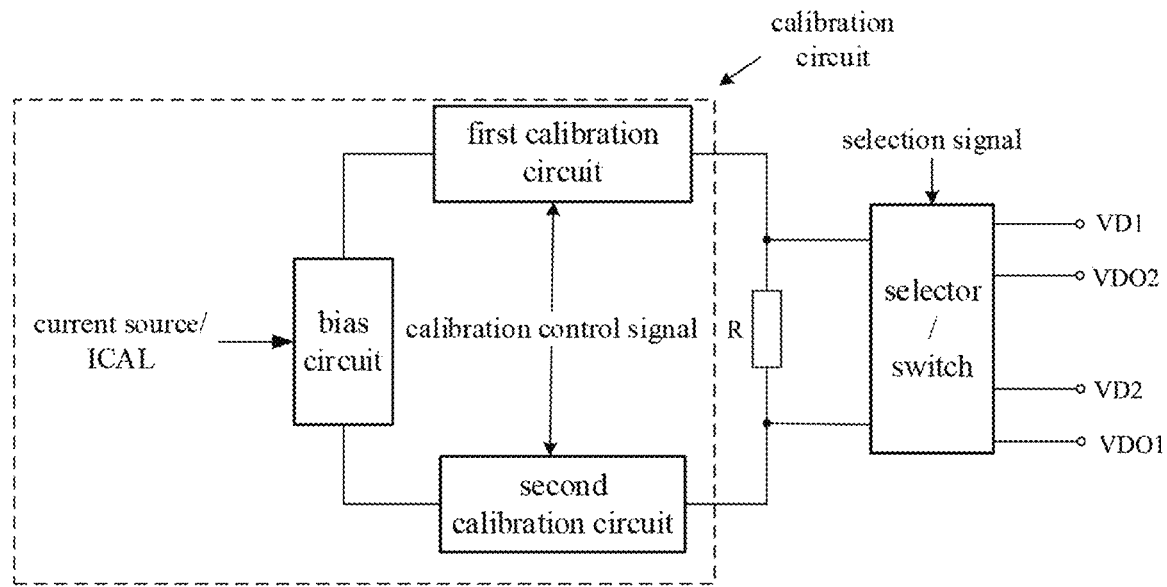
FIG. 3 is a schematic view of a calibration circuit according to a certain embodiment of the present disclosure.

Optionally, this embodiment provides a specific calibration circuit, as shown in FIG. 3, which includes: a current source, a bias circuit, a first calibration circuit and/or a second calibration circuit. The bias circuit is connected to the current source for generating a bias current, and the bias current is represented by ICAL; the resistor R is connected between the first calibration circuit and the second calibration circuit, or in a path of the first calibration circuit or the second calibration circuit; and currents of the first calibration circuit and the second calibration circuit are adjusted synchronously, so that current flowing through the resistor is also synchronously adjusted. The essence thereof is to form a current channel with the first calibration circuit, the resistor R, and the second calibration circuit, wherein the magnitude of current(s) of the first calibration circuit and/or the second calibration circuit are/is adjusted synchronously, so that the current in this channel changes to realize the change of the voltage drop across two ends of the resistor R, and the voltage drop is equal to I*R.

Figure 4A:
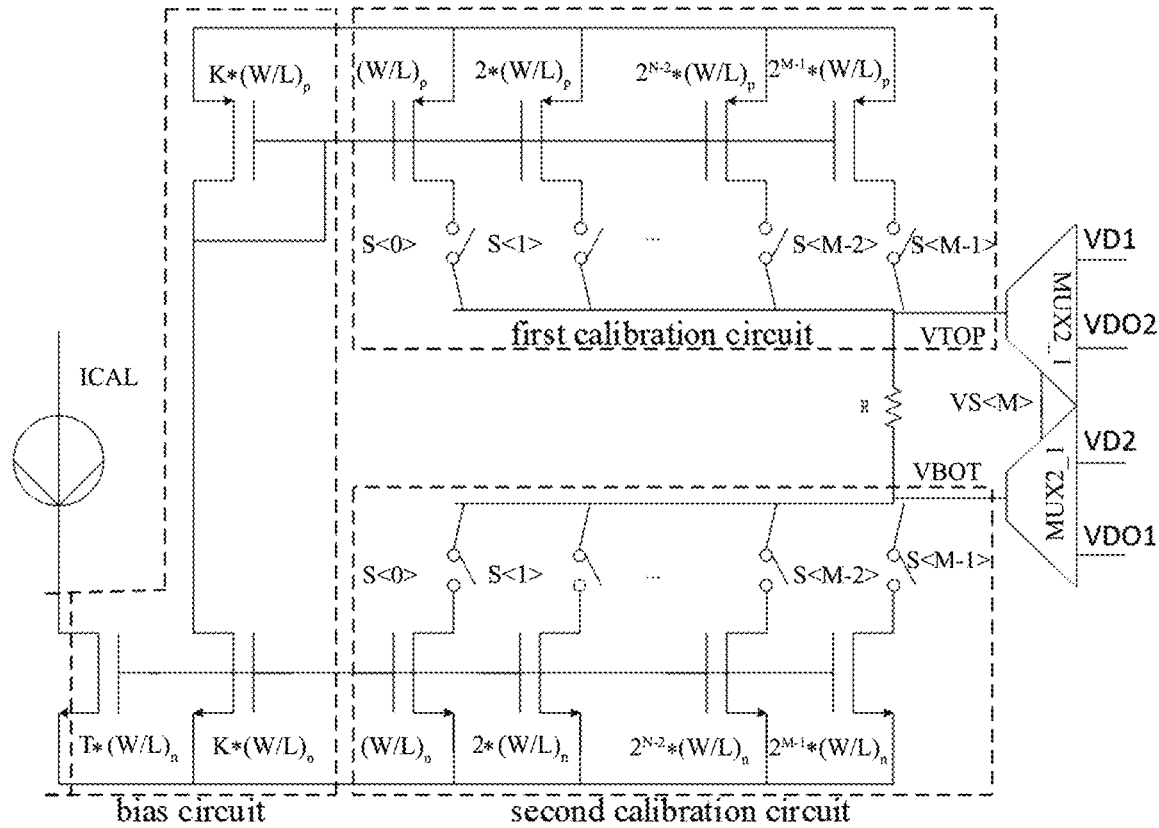
FIG. 4A is a circuit view of a certain specific embodiment of the calibration circuit.

Referring to FIG. 4A, the first calibration circuit comprises M groups of MOS tube assemblies, and each of the groups of MOS tube assemblies and the bias circuit form a first mirror output channel; the second calibration circuit comprises M groups of MOS tube assemblies, and each of the groups of MOS tube assemblies and the bias circuit form a second mirror output channel; and the resistor R is connected between the M groups of first mirror output channels and the M groups of second mirror output channels, and each of the groups of first mirror output channels and each of the groups of second mirror output channels are both provided with a controlled switch(S<O>,S<1>, ... , S<M-1>), and magnitude of the current flowing through the resistor is adjusted through switching of the controlled switch. Specifically, the controlled switch S<i> is turned on or off synchronously to keep the current magnitude(s) of the first calibration circuit and/or the second calibration circuit synchronous (herein, i represents 0, 1 M−1). For example, in FIG. 4A, when S<0>, S<1>, and S<2>are turned on synchronously, the current (I) flowing through the resistor R satisfies: I=K/T*VS<2:0>*ICAL, wherein K/T*VS<2:0>indicates the mirror ratio of the corresponding MOS tube assemblies, wherein K/T is a fixed quantity, so what is actually adjusted is the value of VS<(M−1):0>, which is the number of MOS tubes in the corresponding MOS tube assemblies. In order to ensure that the mirror ratio is accurate and uniform, parameters of the MOS tubes used in each MOS tube assembly are the same. Here, M represents the adjustment precision, and the larger M is, the larger the adjustment range or the higher resolution is.

Optionally, in some embodiments, the mirror ratio of the M groups of MOS tube assemblies(of the first calibration circuit or the second calibration circuit) gradually increases exponentially with an exponent of 2, which is $2^0$, $2^1$ ... $2^{M-2}$, $2^{M-1}$ in sequence, that is, the number of MOS tubes in the MOS tube assembly is $2^0, 2^1, \ldots 2^{M-2}, 2^{M-1}$ in sequence. During adjustment, the output currents of the M groups of first mirror output channels and the output currents of the M groups of second mirror output channels increase or decrease sequentially in proportion. That is to say, they must be sequentially adjusted according to $2^0, 2^1 \ldots 2^{M-2}, 2^{M-1}$ forward or reverse order to judge whether the output precision requirements are met, and skip adjustment is not allowed.

Figure 4B:
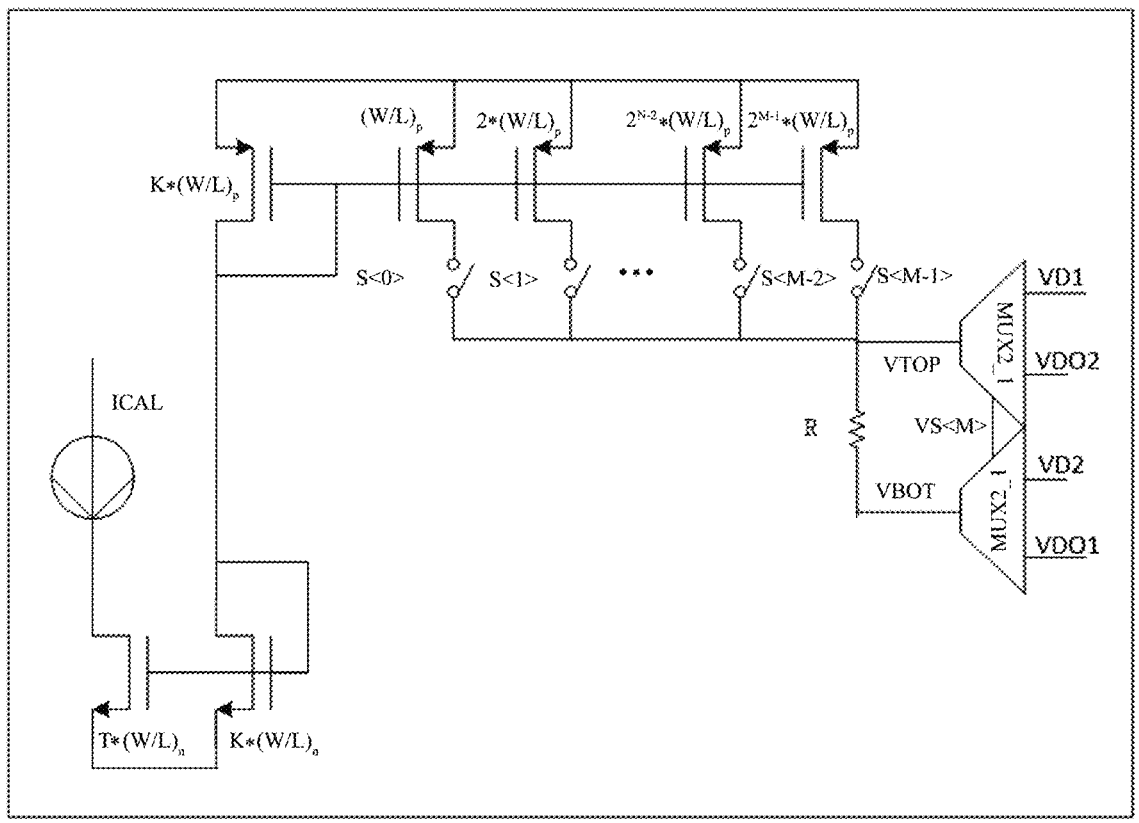
FIG. 4B is a circuit view of another specific embodiment of the calibration circuit.

Different from FIG. 4A, in FIG. 4B, only the first calibration circuit is included, similarly, only the second calibration circuit may also be included. The resistor R is connected in the mirror output channel formed by the first calibration circuit, so that the adjustment of the current across two ends of the resistor R can also be achieved.

Figure 5:
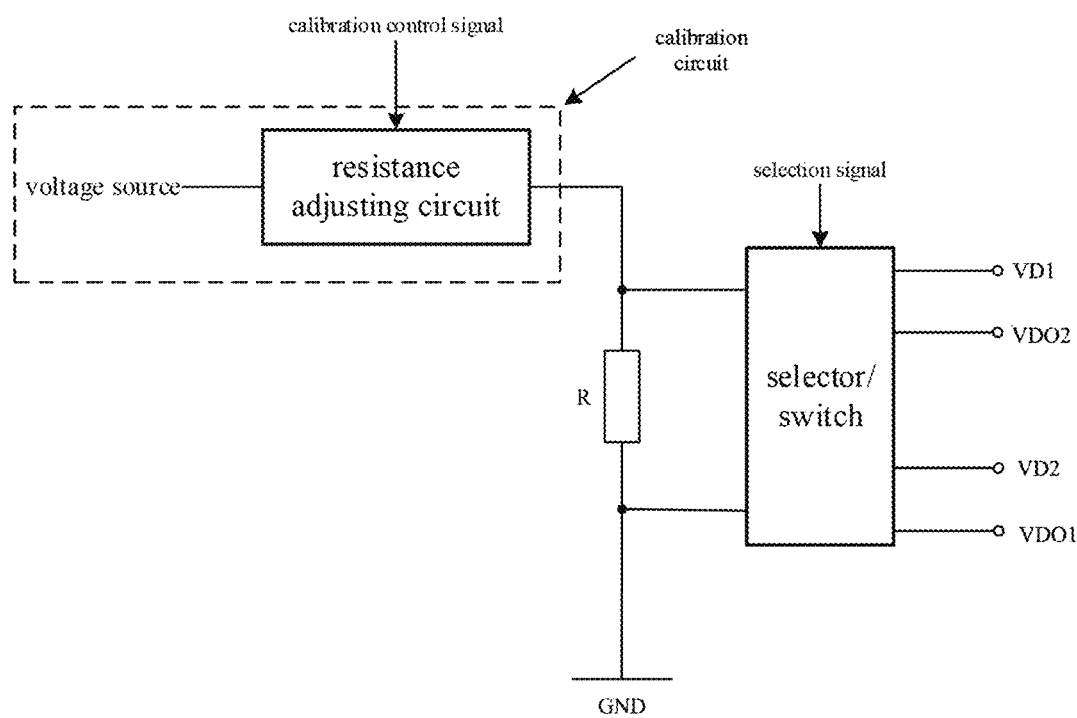
FIG. 5 is a schematic view of the calibration circuit according to another embodiment of the present disclosure.
Figure 6:
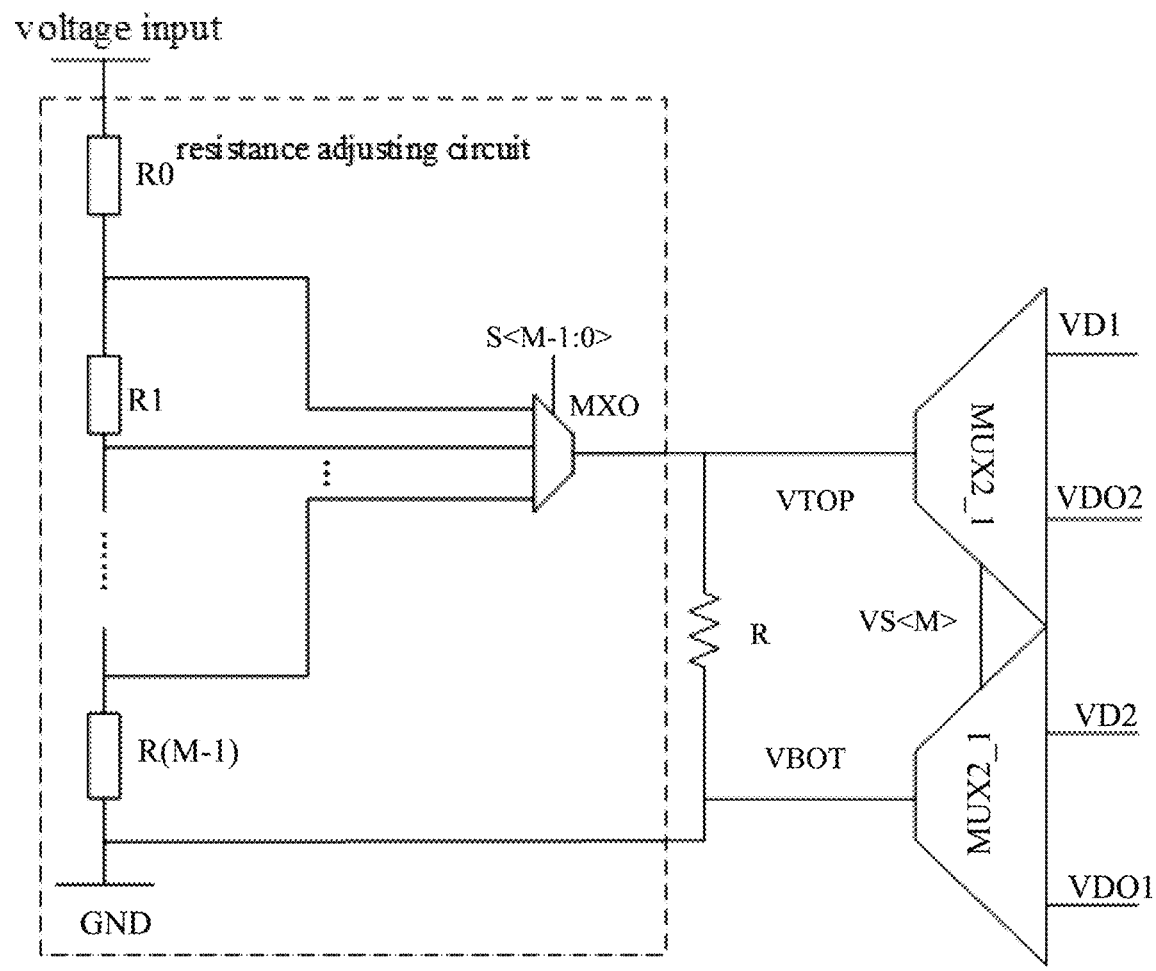
FIG. 6 is a circuit view of a certain embodiment of a resistance adjusting circuit in FIG. 5.

Referring to FIG. 5, this embodiment also provides another calibration circuit, which includes a voltage source and a resistance adjusting circuit, wherein the voltage source, the resistance adjusting circuit, and the resistor R form a current channel, the current channel here can be understood as a closed loop circuit, so that the resistor R has a current formed (i.e. a current flows through the resistor R). In the calibration circuit of this embodiment, the voltage source is a fixed voltage source, and based on Ohm's law I=U/R, when the value of R changes, the value of the current I also changes accordingly. It should be stated that the resistance adjusting circuit in this embodiment is not used to adjust the value of the resistance R, but to adjust the effective resistance value in the current channel. The value of the resistance R is a fixed value, so when the current changes, the voltage drop across two ends of the resistor R may also changes. The easiest way to achieve the resistance adjusting circuit is to control the connecting of other resistors, that is, it is achieved by adding or reducing other resistors; or the resistance adjusting circuit itself is a resistor with adjustable resistance value (such as a slide rheostat). As shown in FIG. 6, a specific embodiment is given, the resistance adjusting circuit includes: M groups of calibration resistors (equivalent to a resistor with adjustable resistance value) connected in series in sequence, and a M-way multiplexer, wherein the M-way multiplexer is used to control the number of calibration resistors connected in series in the current channel to achieve adjustment of the current flowing through the resistor. In order to further improve the resolution of the adjustment precision, for the connected M groups of calibration resistors, either the individual calibration resistors have the same resistance value, or the resistance values thereof increase exponentially or geometrically.

Figure 7:
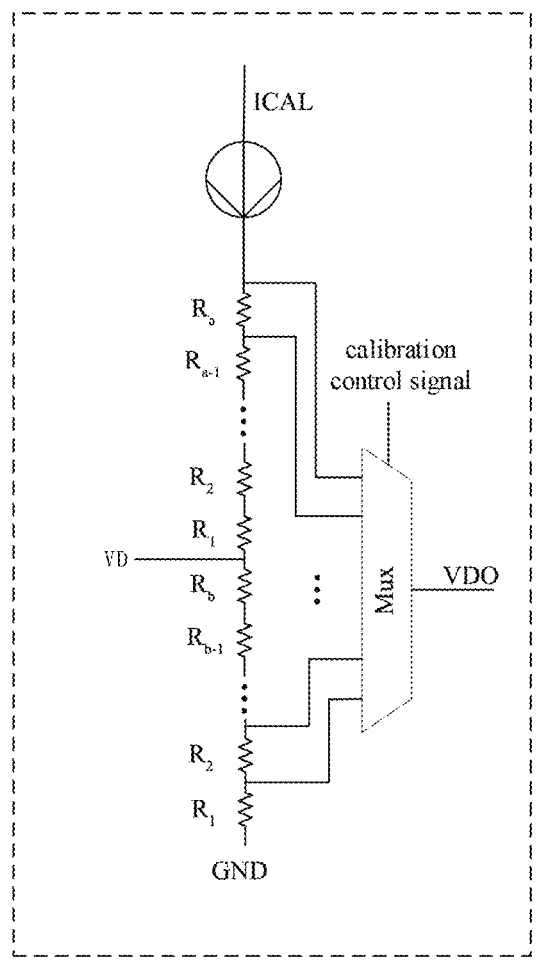
FIG. 7 is a schematic view of the calibration circuit according to another embodiment of the present disclosure.

This embodiment also provides another calibration circuit, which includes a current source and a resistance adjusting circuit, wherein the resistance adjusting circuit is used to adjust the resistance value of the resistor R. Different from the embodiments shown in FIG. 5 and FIG. 6, the current in this embodiment is fixed, so it is realized by adjusting the resistance value of the resistor R. Referring to what is shown in FIG. 7, the resistor R is an equivalent resistor at this time, and the resistance adjusting circuit includes an equivalent resistor composed of 2n divider resistors, and a selector Mux, the 2n divider resistors are connected in series in sequence, and the first bias voltage VD is applied between the n-th divider resistor and the n+1-th divider resistor (i.e. the inverting input terminal of the amplifier AMP_C is electrically connected to the connection points of the n-th divider resistor and the n+1-th divider resistor), individual nodes of the 2n divider resistors are connected to the input channel of the selector Mux, and the output channel of the selector Mux is connected to the drain terminal of the MOS tube of the constant current source output channel, that is, the output channel of the selector Mux outputs the third bias voltage VDO. Based on FIG. 7, it can be seen that when the n+1-th to 2n-th divider resistors are selected, VD>VDO, on the contrary, when the 1st to n-th divider resistors are selected, VD<VDO, so as to realize the increased or decreased adjustment of the third bias voltage VDO, and the specific adjustment precision is based on the node selection of the divider resistors, and the selection is determined by the calibration control signal. It should be noted that the current source or voltage source of the calibration circuit in the present disclosure and the embodiment may be independent, or may be a current generated by a reference current generating module of a drive chip or a voltage generated by a bias generating circuit.

The above-mentioned scheme of the present disclosure is mainly based on the principle of resistance adjustment. The resistance of the resistor R itself can be adjusted, and the resistance of the effective resistor in the current channel can also be adjusted to realize different I*R adjustment principles.

Figure 8:
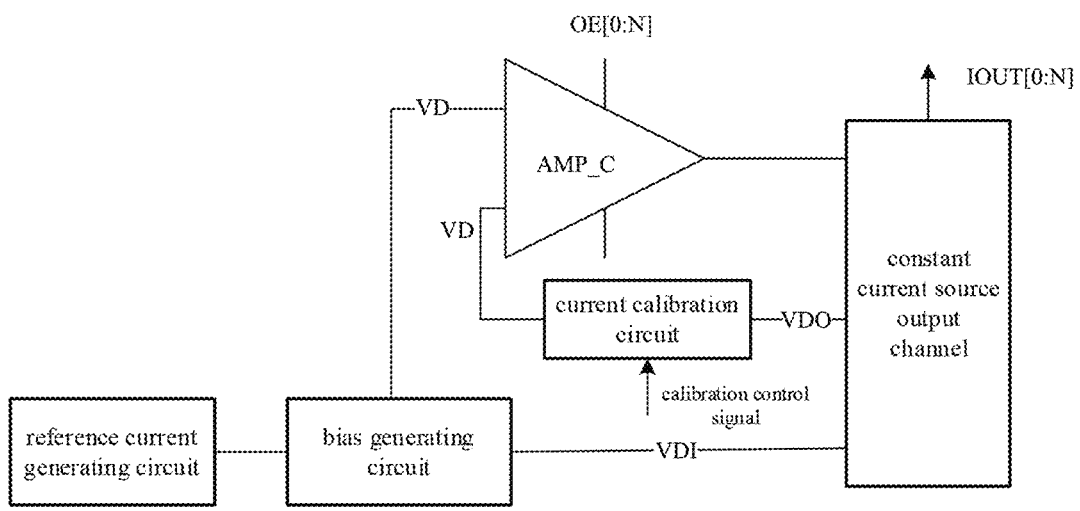
FIG. 8 is a schematic view of a constant current source drive circuit according to a certain embodiment of the present disclosure.

A second aspect of this embodiment provides a constant current source drive circuit. Referring to what is shown in FIG. 8, the constant current source drive circuit includes a reference current generating circuit, a bias generating circuit, and one or more constant current source output channels. The reference current generating circuit is used to generate the reference current; the bias generating circuit is inputted with the reference current and used to generate the first bias voltage VD and the second bias voltage VGI required by the constant current source output channel; the constant current source output channel is connected to the bias generating circuit, and outputs a constant current based on the first bias voltage VD and the second bias voltage VGI; and the current calibration circuit according to any of the foregoing embodiments is also included, the current calibration circuit calibrates the first bias voltage VD, and then obtains a third bias voltage VDO and outputs the third bias voltage to the constant current source output channel.

Figure 9:
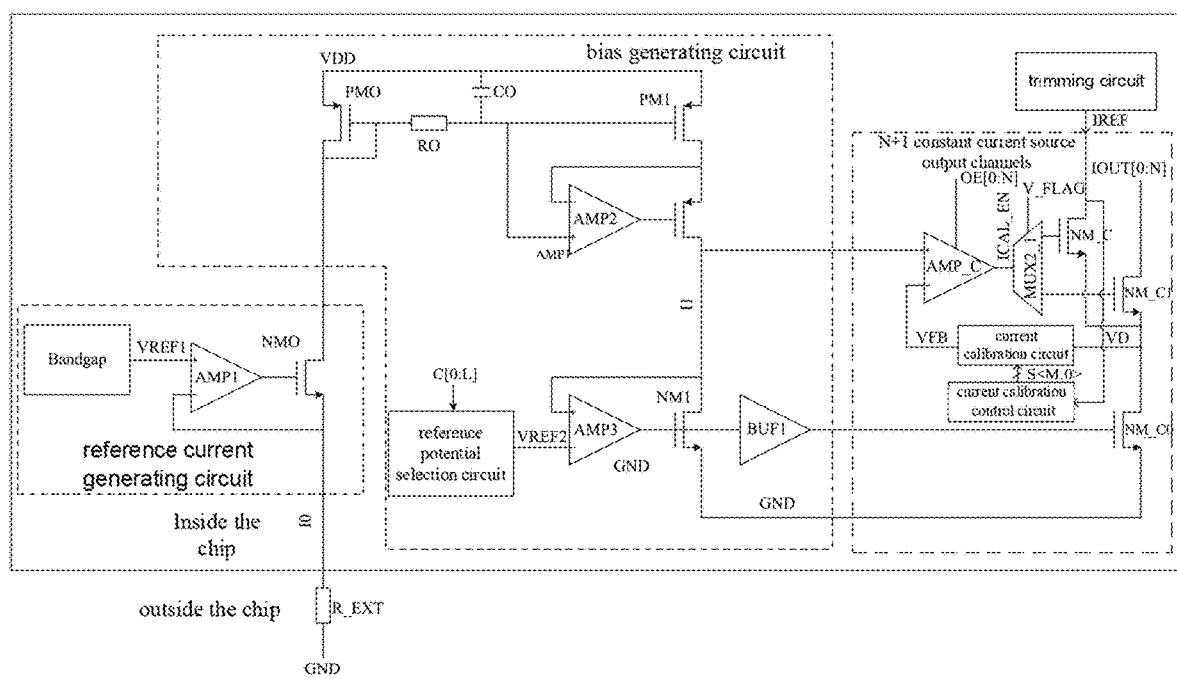
FIG. 9 is an embodied circuit example of FIG. 8.
Figure 11:
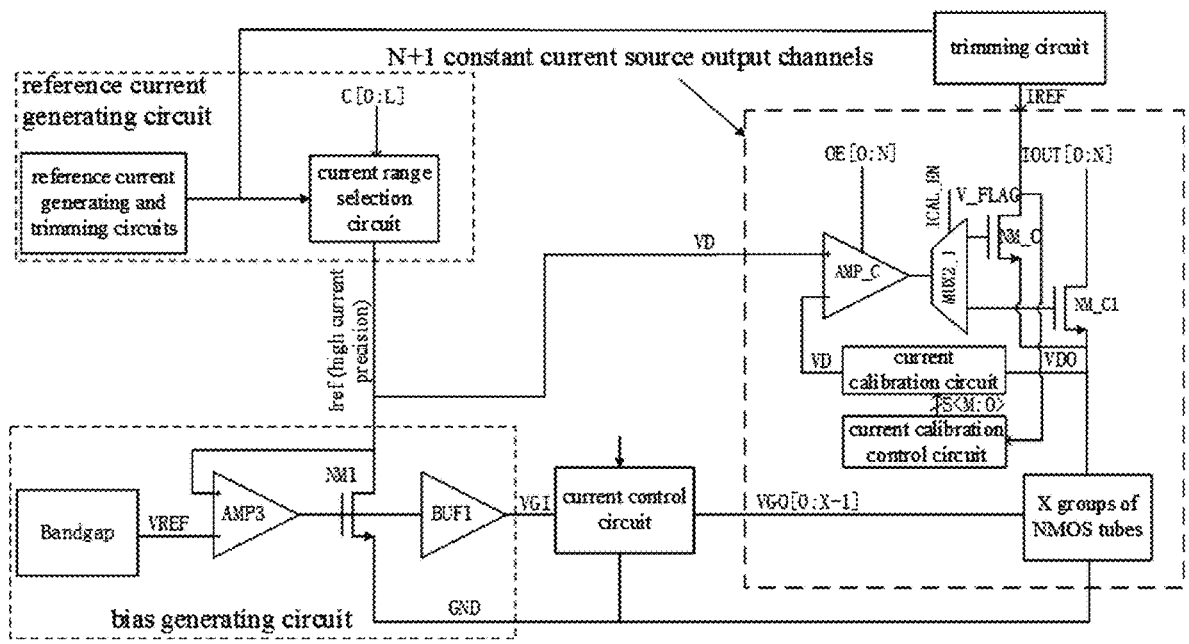
FIG. 11 is an embodied circuit example of FIG. 10.

Hereinafter, the reference current generating circuit, bias generating circuit, and constant current source output channel will be described in detail. It is worth noting that, unless otherwise special emphasized, the reference current generating circuit, bias generating circuit, and constant current source output channel in the present disclosure all do not refer to some specific circuit, but all circuits that can be implemented and known by those skilled in the art. Referring to FIG. 1, FIG. 9, and FIG. 11, a reference current generating circuit, a bias generating circuit, and a constant current source output channel are included.

The reference current generating circuits in FIG. 1 and FIG. 9 are composed of a gap voltage source(Bandgap voltage reference, Bandgap for short), an operational amplifier AMP1 and an NMOS tube NM0, wherein the gap voltage source(Bandgap) is used to generate the reference voltage VREF, and the operational amplifier AMP1 clamps the drain voltage of the NM0 to VREF, a reference current I0, i.e., the source-drain current of the NM0 is generated at this time, and the reference current in FIG. 11 is represented by Iref. In FIG. 1 and FIG. 9, the reference current I0=VREF/R_EXT, wherein R_EXT represents the resistance of an external resistor.

The bias generating circuit generates the bias current and bias voltage based on the reference current I0 and the reference voltage VREF. As shown in FIG. 1, the bias generating circuit consists of two operational amplifiers AMP2 and AMP3, several MOS tubes and a gain BUF1, wherein the inverting input terminal of AMP3 is inputted with a second reference voltage VREF2, and the drain voltage of the MOS tube NM_C0 of the constant current source output channel is clamped to VREF2, so that the first bias voltage VD is provided for the drain terminal of the MOS tube of the constant current source output channel. The output terminal of AMP3 outputs the second bias voltage VGI through the gain BUF1 to the gate terminal of the MOS tube NM_C0 of the constant current source output channel.

Referring to what is shown in FIG. 9, the bias generating circuit is basically similar to that in FIG. 1, with the difference lying in that it also includes a reference potential selection circuit for the second reference voltage VREF2.

Different from FIG. 1 and FIG. 9, the bias generating circuit in FIG. 11 consists of a gap voltage source (Bandgap voltage reference, Bandgap for short), one operational amplifier AMP3, one NMOS tube NM1 and a gain BUF1, wherein the gap voltage source (Bandgap) is used to generate the reference voltage VREF, and the other working principles are basically similar. In addition to FIG. 1, FIG. 9, and FIG. 11, the bias generating circuit, as a conventional circuit in the art, can also be designed to have various variations.

The constant current source output channel is mainly a mirror output channel composed of MOS tube(s) and operational amplifier(s). For specific composition thereof, reference is made to FIG. 1, FIG. 9 and FIG. 11. In the above, compared with FIG. 1, in FIG. 9 and FIG. 11, a current calibration circuit is added in this embodiment, which is used for the precision adjustment of the constant current source output channel.

In the constant current source drive circuit shown in FIG. 1 and FIG. 9, there are the following defects. 1. The output ranges of the general constant current source drive chips are all relatively wide, wherein for most chips on the market, the maximum output value is more than 10 times the minimum output value, the current is adjusted by R_EXT, then the changes of I0, I1 and IOUT above are all more than 10 times. The smaller the R_EXT is, the larger the I0 and I1 are, that is, the greater the power consumption of the chip is. 2. When the output current is very small, the |VGS| (absolute value of VGS, VGS being the gate-source voltage of the MOS tube) of each MOS tube is very small, resulting in poor current mirror performance and also poor output precision of the constant current source. 3. In order to meet the precision of the minimum output current, it is necessary to increase the width and length of the MOS tube, that is, to increase the area of the MOS tube device. The most effective method is to increase the length. In order to meet the maximum output current, it is necessary to increase the width-to-length ratio W/L of the MOS tube, wherein on the basis of increasing the length, simultaneously, the width-to-length ratio W/L is increased, that is, the width must also be increased, which results in a very large chip area; it is difficult to improve the current precision, because the current precision is proportional to the arithmetic square root of the device area, and due to the production process, when the area increases to a certain amount, the precision will not always improve.

Figure 10:
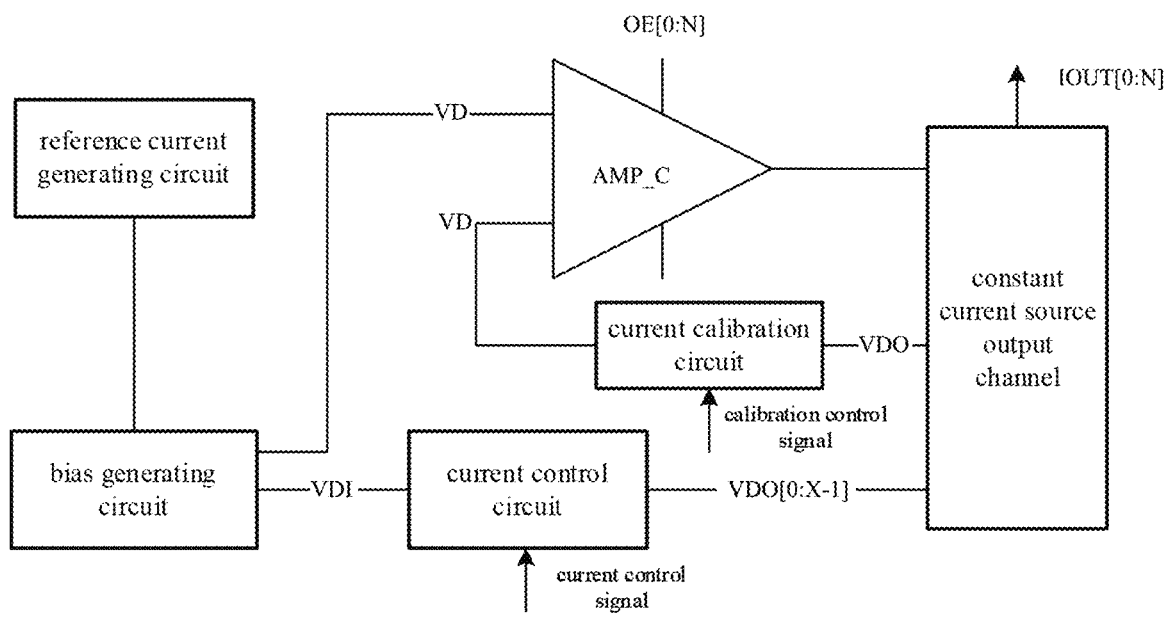
FIG. 10 is a schematic view of the constant current source drive circuit according to another embodiment of the present disclosure.

In order to solve the above-mentioned problems, this embodiment also provides a solution for adjusting the reference current I0 without using the external resistor R_EXT. Referring to FIG. 10, a constant current source drive circuit includes a reference current generating circuit, a bias generating circuit, and one or more constant current source output channels, and includes a current control circuit, wherein the current control circuit is connected in series between the bias generating circuit and the constant current source output channel, and is used to adjust the magnitude of the current of the constant current source output channel. The current control circuit includes X output terminals and at least one input terminal, the second bias voltage VGI is applied to the input terminal; when the control signal of the corresponding output terminal is valid, the corresponding output terminal thereof outputs the second bias voltage VGI to the gate terminal of the corresponding second MOS tube, so as to adjust the mirror ratio of the constant current source output channel, the value of X here is an integer greater than or equal to 1, and the value of X is determined by the constant current source output channel. Referring to what is shown in FIG. 11, the constant current source output channel includes a first MOS tube NM_C1, X groups of second MOS tubes, and a first operational amplifier, wherein the first MOS tube NM_C1 is used as the output switch of the constant current source output channel, and is also used to eliminate static electricity, wherein the control signal of NM_C1 is represented by OE[0:N]; the second bias voltage VGI is applied to the gate terminal of the second MOS tube; the first bias voltage VD generated by the bias generating circuit is applied to the non-inverting input terminal of the first operational amplifier AMP_C, the inverting input terminal of AMP_C is connected to the current calibration circuit, and the current calibration circuit is connected to the drain terminal of the second MOS tube; the output terminal of AMP_C is connected to the gate terminal of the first MOS tube NM_C1, and controls, by controlling the AMP_C output, turn-on and turn-off of the constant current source output channel.

Figure 12:
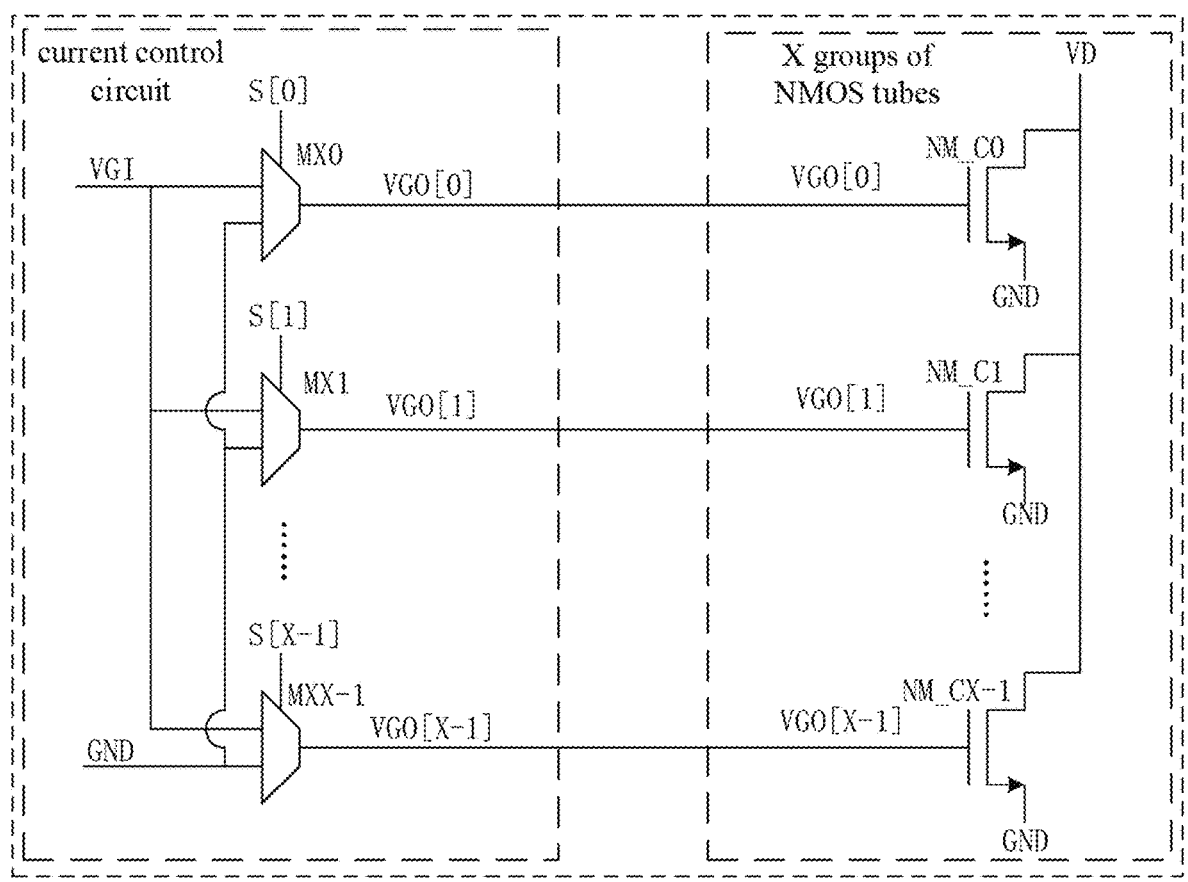
FIG. 12 is an example circuit of a current control circuit and X groups of second MOS tubes according to an embodiment of the present disclosure.

Referring to FIG. 12, a specific implementation scheme of the current control circuit and the second MOS tube is given. The current control circuit includes an input terminal to which the second bias voltage VGI is applied, X output terminals VGO[0]-VGO[X-1], and X selectors or switches used to determine whether the output terminal is turned on or off. When the output terminal is ON, the second bias voltage VGI is outputted; the corresponding second MOS tube includes X groups of NMOS tubes (NM_C0-NM_CX-1) connected in parallel, and the gate terminals of the individual NMOS tube are respectively connected to an output terminal. When the output terminal outputs the second bias voltage VGI, the NMOS tube is tuned on to output current, and the mirror ratio between the output current and the reference current is determined by controlling the number of NMOS tubes in conduction, therefore, the range adjustment of the output current can be realized without the external resistor R_EXT, which saves the chip area.

In order to realize precise adjustment or automatic adjustment of the current calibration circuit, this embodiment also provides an adjustment solution for the constant current source calibration circuit. Referring to the embodiments shown in FIG. 9 and FIG. 11, which include a current calibration control circuit for controlling the current calibration circuit to perform calibration, a trimming circuit, a third MOS tube NM_C, and a selector. The output signal of the first operational amplifier AMP_C is alternatively inputted through the selector to the gate terminal of the third MOS tube NM_C or the gate terminal of the first MOS tube NM_C1; the trimming circuit is used for outputting trimming current to the drain terminal of the third MOS tube, the source terminal of the third MOS tube is connected to the current calibration circuit; the input terminal of the current calibration control circuit is connected to the drain terminal of the third MOS tube NM_C. In the output state, the output signal of the first operational amplifier is inputted to the selector which sends it to the gate terminal of the first MOS tube; and in the calibration state, the output signal of the first operational amplifier is inputted to the selector which sends it to the gate terminal of the third MOS tube, and the current calibration control circuit controls, based on the drain voltage of the third MOS tube, the current calibration circuit to perform current adjustment.

Based on the foregoing, it can be known that the current calibration circuit realizes adjustment of the voltage drop across two ends of the resistor R based on the calibration control signal. The calibration control signal may be controlled manually or automatically. In this embodiment, the implementation method of automatic adjustment is emphasized. Referring to the implementation methods of the current calibration circuit provided in FIG. 4A, FIG. 6, and FIG. 7, it can be seen that all the calibration methods are all realized by node control, and the voltage drop adjustment is realized by connecting to different node to change the current or resistance. Therefore, the current calibration control circuit provided in this embodiment has universal applicability. The current calibration control circuit is used to output M+1 groups of calibration control signals S<M:0>, wherein 1 group of instructions is used to control the selector or switch, to select one end of the resistor to be connected to the constant current source output channel; and M groups of instructions are used to control the current adjustment of the current calibration circuit. In the above, in the embodiment provided in FIG. 7, there are 2n calibration control signals, but the essences are the same.

In FIG. 4A, M+1 groups of calibration control signals S<M:0>include two usages, wherein S<M-1:0>is used to control the ON or OFF state of the switches, the adjustment of the current flowing through the resistor R is realized by controlling the mirror ratio of the mirror output formed by the first calibration circuit and the bias circuit or formed by the second calibration circuit and the bias circuit, the other group of signals control the selector/switch, which is individually named VS<M>, that is, the first end VTOP or the second end VBOT of the resistor R is selected through VS<M>to be connected to the drain terminal of the second MOS tube. Similarly, in FIG. 6, S<M-1:0>is used to control the selector to select the corresponding node to be connected with the resistor R, and the function of VS<M>is the same as that of the embodiment shown in FIG. 4A. Different from the embodiments shown in FIG. 4A and FIG. 6, a+b calibration control signals are included in FIG. 7 for the selector to realize node selection. The a+b divider resistors are connected in series in sequence, the first bias voltage VD is applied to the a-th node of the divider resistor, individual nodes of the a+b divider resistors are connected to the input channels of the selector Mux (for example, in a one-to-one correspondence manner, as shown in FIG. 7), and the output channel of the selector Mux is connected to the drain terminal of the MOS tube of the constant current source output channel, that is, the output channel of the selector Mux outputs the third bias voltage VDO. Based on FIG. 7, it can be seen that when the VDO node is located below VD, VD>VDO, on the contrary, when the VDO node is located above VD, VD<VDO, so as to realize the increased or decreased adjustment of the third bias voltage VDO, and the specific adjustment precision is based on the node selection of the divider resistors, the selection is determined by the calibration control signal. It should be noted that the current source or voltage source of the calibration circuit in the present disclosure and the embodiment may be independent, or may be a current generated by a reference current generating module of a drive chip or a voltage generated by a bias generating circuit.

Figure 13:
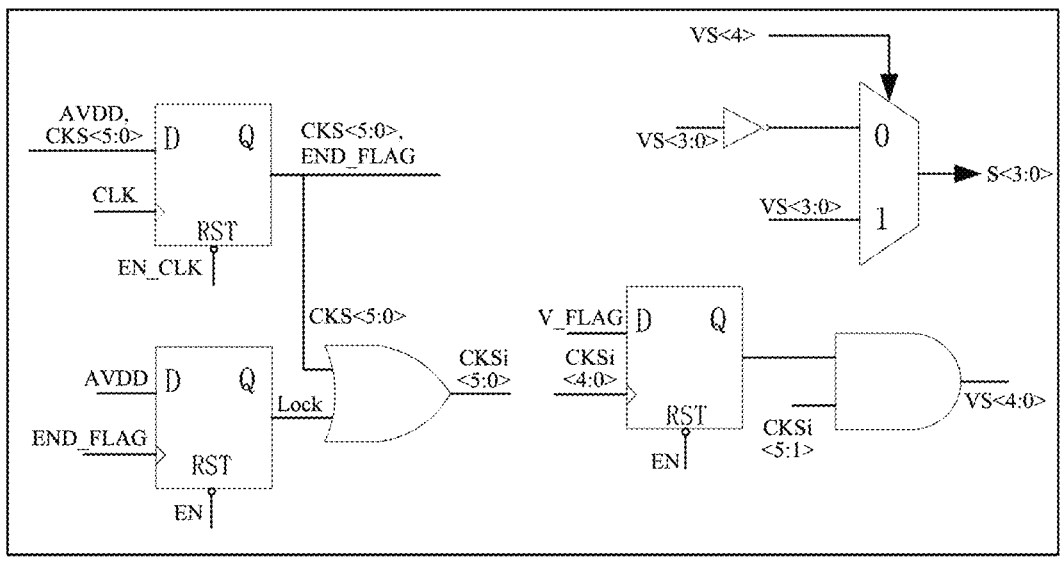
FIG. 13 is a current calibration control circuit according to an embodiment of the present disclosure.

Based on the above-mentioned control scheme, this embodiment provides a specific current calibration control circuit. Referring to FIG. 13, that the value of M is 4 is taken as example for demonstration.

In the calibration state, the input terminal of the current calibration control circuit is connected to the drain terminal of the third MOS tube. Referring to what is shown in FIG. 9 and FIG. 11, the drain voltage of the third MOS tube is represented by V_FLAG.

At this time, the drain terminal of the third MOS tube is connected to the trimming circuit. The trimming circuit generates a high-precision target current IREF, and the magnitude of the current of the constant current source output channel (i.e., the magnitude of the channel output current in the output state) is equal to the magnitude of the drain current of the third MOS tube, wherein the current of the constant current source output channel is represented by IOUT, and N+1 channels are represented by IOUT[0:N]. IREF is the reference current trimmed to a set current precision. Ideally, the magnitude of the channel output current (IOUT[0:N]) is the same as the set current value of the reference current IREF; Due to the current deviation caused by various non-ideal factors between chips and between channels, the output current (IOUT[0:N]) of each channel has a current deviation from IREF, so it is necessary to perform current calibration channel by channel; when a certain channel is calibrated, the output of AMP_C is disconnected from NM_C1 and connected to the gate terminal of NM_C at the same time. At this time, IREF is connected to the current calibration control circuit. If IOUT>IREF, the drain voltage V_FLAG of NM_C is very low, which will be recognized as 0 by the calibration control circuit, and then IOUT is reduced by adjusting S<M:0>; if IOUT<IREF, the drain voltage V_FLAG of NM_C is very high, which will be recognized as 1 by the current calibration control circuit, and then IOUT is increased by adjusting S<M:0> until IOUT is adjusted within the precision range close to IREF, the system stops adjusting S<M:0>, and latches the calibration value. After the channel calibration is completed, the output of AMP_C is disconnected from NM_C and reconnected to the gate terminal of NM_C1. At this time, the channel can display normally.

It is worth noting that the above-mentioned embodiments are all demonstrated and described based on the common anode drive chip as an example. For the common cathode chip, the solution provided in the present disclosure is also applicable. The only difference is that the types of MOS tubes are different, wherein the output channel in the common anode chip uses NMOS as output, common cathode uses PMOS tube as output, and other MOS tube types can be reversed accordingly.

Figure 14:
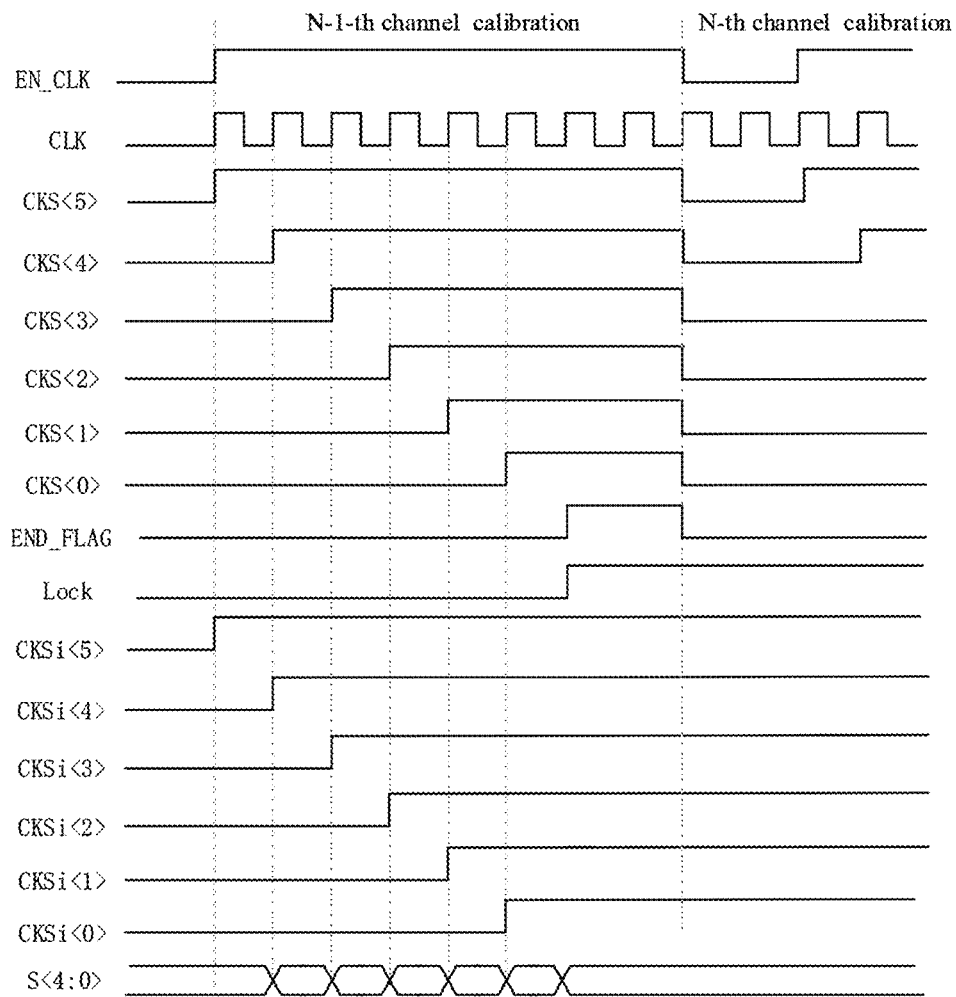
FIG. 14 is a schematic view of an output waveform of FIG. 13.

Specifically, as shown in FIG. 13, in the figure, the compensation register containing a 5-bit calibration control signal is taken as an example, which can actually be any number of bits. CLK is a control clock. The D flip-flop generates clock signals CKS<5>-CKS<0> and END_FLAG signal with different starting times in sequence, wherein the END_FLAG signal is used to end the calibration function (when the END_FLAG is high, the calibration ends, and when the END_FLAG is low, calibration starts). When END_FLAG (high level) is valid, the D flip-flop causes the LOCK signal to change to a high level, locking the OR logic gate, so that CKSi<5:0> is no longer flipped. Before this moment, the LOCK signal is low level, CKS<5:0> is outputted as signal CKSi<5:0>. The control circuit collects the V_FLAG signal and stores the signal in each bit of the compensation register VS<4:0> in sequence. The output logics of individual signals are shown in FIG. 14.

Compensation register S<4:0>, which contains 1-bit offset compensation polarity register S<4>, and 4-bit offset compensation register S<3:0>; if the offset compensation polarity register S<4>=1, the output VDO>VD; if the offset compensation polarity register S<4>=0, the output VDO<VD. The 4-bit offset compensation register S<3:0> controls the magnitude of the current in the calibration circuit. Different magnitudes of currents flow through the resistor to generate different magnitudes of voltage drops, thereby adjusting the difference between the third bias voltage VDO and the first bias voltage VD. The EN signal is initially a low level. The D flip-flop is reset and the control circuit does not work. When the EN signal changes to a high level, the current calibration begins.

If the initial IOUT<IREF, V_FLAG=1, the rising edge of CLKSi<5> collects V_FLAG and stores the same in VS<4>, the offset compensation polarity register S<4>=1, then the output VDO>VD, VDO increases, then IOUT increases, thereby reducing the deviation from IREF; in the next clock cycle, if IOUT>IREF, V_FLAG=0, the rising edge of CLKSi<4> collects V_FLAG and stores the same in VS<3>, S<3>=0; if IOUT<IREF, V_FLAG=1, the rising edge of CLKSi<4> collects V_FLAG and stores the same in VS<3>, S<3>=1, S<3:0> increases, thereby causing the current in the current calibration circuit to increase, the voltage difference between VDO and VD increases, VDO increases, resulting in an increase in IOUT, which reduces the deviation from IREF. They are continued in sequence until the comparison of each bit of S<3:0> is completed.

If the initial IOUT>IREF, V_FLAG=0, the rising edge of CLKSi<5> collects

V_FLAG and stores the same in VS<4>, the offset compensation polarity register S<4>=0, then the output VDO<VD; in a next clock cycle, if IOUT>IREF, V_FLAG=0, the rising edge of CLKSi<4> collects V_FLAG and stores the same in VS<3>, the VS<3> goes through an inverter and S<3>=1, S<3:0> increases, causing the current in the current calibration circuit to increase, the voltage difference between VDO and VD increases, and VDO decreases, resulting in a decrease in IOUT, which reduces a deviation from IREF; if IOUT<IREF, V_FLAG=1, the rising edge of CLKSi<4> collects V_FLAG, and stores the same in VS<3>, the VS<3> goes through an inverter and S<3>=0, and they are continued in sequence until the comparison of each bit of S<3:0> is completed.

Before the next round of current calibration starts, the EN signal is set to be a low level, the D flip-flop is reset, and the LOCK signal changes to be a low level to release the lock state. Next, the EN signal is set to be a high level again, and the next round of current calibration starts.

A third aspect of this embodiment provides a drive chip, including the constant current source drive circuit according to the second aspect of the present disclosure, which is used in a constant current drive chip for an LED display screen.

A fourth aspect of this embodiment provides an electronic device, including the drive chip according to the third aspect of the present disclosure, which may specifically be a display screen device, an LED billboard, and the like.

The above are only preferred embodiments of the present disclosure, and it should be understood that the present disclosure is not limited to the forms disclosed herein, and should not be regarded as excluding other embodiments, but can be used in various other combinations, modifications and environments, and can be modified within the conceived scope herein, through the above teachings or technology or knowledge in the relevant field. However, modifications and changes made by those skilled in the art do not depart from the spirit and scope of the present disclosure, and should all fall within the protection scope of the appended claims of the present disclosure.

What is claimed is:

1. A constant current source drive circuit, comprising:
   a reference current generating circuit, configured to generate a reference current;
   a bias generating circuit, configured to be inputted with the reference current, to generate a first bias voltage VD and a second bias voltage VGI required by one or more constant current source output channels;

the one or more constant current source output channels, connected to the bias generating circuit, for outputting a constant current based on the first bias voltage VD and the second bias voltage VGI; and a current calibration circuit, comprising:
a resistor;
a calibration circuit, connected to the resistor and configured for adjusting a voltage drop across two ends of the resistor; and
a selector or a switch, connected to the two ends of the resistor, and configured to select one end of the resistor to be connected to the one or more constant current source output channels, and a corresponding other end to be supplied with the first bias voltage VD,
wherein the current calibration circuit is configured to calibrate the first bias voltage VD, and then obtain a third bias voltage VDO and output the third bias voltage to the one or more constant current source output channels.

2. The constant current source drive circuit according to claim 1, wherein the constant current source output channel comprises:
a first MOS tube, used as an output switch of the one or more constant current source output channel;
X groups of second MOS tubes, wherein X is an integer greater than or equal to 1, wherein the second bias voltage VGI is applied to a gate terminal of the second MOS tube; and
a first operational amplifier, wherein a non-inverting input terminal thereof is supplied with the first bias voltage VD generated by the bias generating circuit, an inverting input terminal thereof is connected to the current calibration circuit, and the current calibration circuit is connected to a drain terminal of the second MOS tube,
wherein an output terminal of the first operational amplifier is connected to a gate terminal of the first MOS tube, and is configured to control turn-on and turn-off of the one or more constant current source output channel by controlling an output of the first operational amplifier.

3. The constant current source drive circuit according to claim 2, further comprising a current calibration control circuit configured to control the current calibration circuit to perform calibration, a trimming circuit, a third MOS tube, and a selector;
wherein an output signal of the first operational amplifier is alternatively inputted through the selector to a gate terminal of the third MOS tube or the gate terminal of the first MOS tube;
the trimming circuit is configured to output trimming current to a drain terminal of the third MOS tube, and a source terminal of the third MOS tube is connected to the current calibration circuit;
an input terminal of the current calibration control circuit is connected to the drain terminal of the third MOS tube;
wherein in an output state, the output signal of the first operational amplifier is inputted into the selector, which sends the output signal to the gate terminal of the first MOS tube; and
in a calibration state, the output signal of the first operational amplifier is inputted into the selector, which sends the output signal to the gate terminal of the third MOS tube, and the current calibration control circuit controls the current calibration circuit to perform current adjustment based on a drain voltage of the third MOS tube.

4. The constant current source drive circuit according to claim 2, further comprising a current control circuit, wherein the current control circuit comprises X output terminals, and at least one input terminal, wherein the second bias voltage VGI is applied to the input terminal;
when a control signal of a corresponding output terminal is valid, the corresponding output terminal thereof outputs the second bias voltage VGI to a gate terminal of a corresponding second MOS tube.

5. The constant current source drive circuit according to claim 1, wherein the calibration circuit comprises:
a current source;
a bias circuit, connected to the current source for generating a bias current; and
a first calibration circuit and/or a second calibration circuit connected to the bias circuit, wherein the resistor is connected between the first calibration circuit and the second calibration circuit, or in a path of the first calibration circuit or the second calibration circuit,
wherein currents of the first calibration circuit and the second calibration circuit are adjusted synchronously, so that current flowing through the resistor is also synchronously adjusted.

6. The constant current source drive circuit according to claim 5, wherein the first calibration circuit comprises M groups of MOS tube assemblies, and each of the groups of MOS tube assemblies and the bias circuit form a first mirror output channel;
the second calibration circuit comprises M groups of MOS tube assemblies, and each of the groups of MOS tube assemblies and the bias circuit form a second mirror output channel; and
the resistor is connected between the M groups of first mirror output channels and the M groups of second mirror output channels, and each of the groups of first mirror output channels and each of the groups of second mirror output channels are both provided with a controlled switch, and magnitude of the current inputted to the resistor is adjusted through switching of the controlled switch.

7. The constant current source drive circuit according to claim 6, wherein a mirror ratio of the M groups of MOS tube assemblies gradually increases exponentially with an exponent of 2, which is $2^0, 2^1 \ldots 2^{M-2}, 2^{M-1}$ in sequence.

8. A drive chip, comprising the constant current source drive circuit according to claim 1.

9. The drive chip according to claim 8, wherein the constant current source output channel comprises:
a first MOS tube, used as an output switch of the one or more constant current source output channel;
X groups of second MOS tubes, wherein X is an integer greater than or equal to 1, wherein the second bias voltage VGI is applied to a gate terminal of the second MOS tube; and
a first operational amplifier, wherein a non-inverting input terminal thereof is supplied with the first bias voltage VD generated by the bias generating circuit, an inverting input terminal thereof is connected to the current calibration circuit, and the current calibration circuit is connected to a drain terminal of the second MOS tube,
wherein an output terminal of the first operational amplifier is connected to a gate terminal of the first MOS tube, and is configured to control turn-on and turn-off of the one or more constant current source output channel by controlling an output of the first operational amplifier.

10. The drive chip according to claim 9, further comprising a current calibration control circuit configured to control the current calibration circuit to perform calibration, a trimming circuit, a third MOS tube, and a selector;
- wherein an output signal of the first operational amplifier is alternatively inputted through the selector to a gate terminal of the third MOS tube or the gate terminal of the first MOS tube;
- the trimming circuit is configured to output trimming current to a drain terminal of the third MOS tube, and a source terminal of the third MOS tube is connected to the current calibration circuit;
- an input terminal of the current calibration control circuit is connected to the drain terminal of the third MOS tube;
- wherein in an output state, the output signal of the first operational amplifier is inputted into the selector, which sends the output signal to the gate terminal of the first MOS tube; and
- in a calibration state, the output signal of the first operational amplifier is inputted into the selector, which sends the output signal to the gate terminal of the third MOS tube, and the current calibration control circuit controls the current calibration circuit to perform current adjustment based on a drain voltage of the third MOS tube.

11. The drive chip according to claim 9, further comprising a current control circuit, wherein the current control circuit comprises X output terminals, and at least one input terminal, wherein the second bias voltage VGI is applied to the input terminal;
- when a control signal of a corresponding output terminal is valid, the corresponding output terminal thereof outputs the second bias voltage VGI to a gate terminal of a corresponding second MOS tube.

12. The drive chip according to claim 8, wherein the calibration circuit comprises:
- a current source;
- a bias circuit, connected to the current source for generating a bias current; and
- a first calibration circuit and/or a second calibration circuit connected to the bias circuit, wherein the resistor is connected between the first calibration circuit and the second calibration circuit, or in a path of the first calibration circuit or the second calibration circuit,
- wherein currents of the first calibration circuit and the second calibration circuit are adjusted synchronously, so that current flowing through the resistor is also synchronously adjusted.

13. The drive chip according to claim 12, wherein the first calibration circuit comprises M groups of MOS tube assemblies, and each of the groups of MOS tube assemblies and the bias circuit form a first mirror output channel;
- the second calibration circuit comprises M groups of MOS tube assemblies, and each of the groups of MOS tube assemblies and the bias circuit form a second mirror output channel; and
- the resistor is connected between the M groups of first mirror output channels and the M groups of second mirror output channels, and each of the groups of first mirror output channels and each of the groups of second mirror output channels are both provided with a controlled switch, and magnitude of the current inputted to the resistor is adjusted through switching of the controlled switch.

14. The drive chip according to claim 13, wherein a mirror ratio of the M groups of MOS tube assemblies gradually increases exponentially with an exponent of 2, which is $2^0$, $2^1 \ldots 2^{M-2}, 2^{M-1}$ in sequence.

* * * * *